C. H. AYARS.
MACHINE FOR SOLDERING THE CAP ENDS OF CANS.
APPLICATION FILED OCT. 27, 1909.
961,743.
Patented June 14, 1910.
2 SHEETS—SHEET 2.
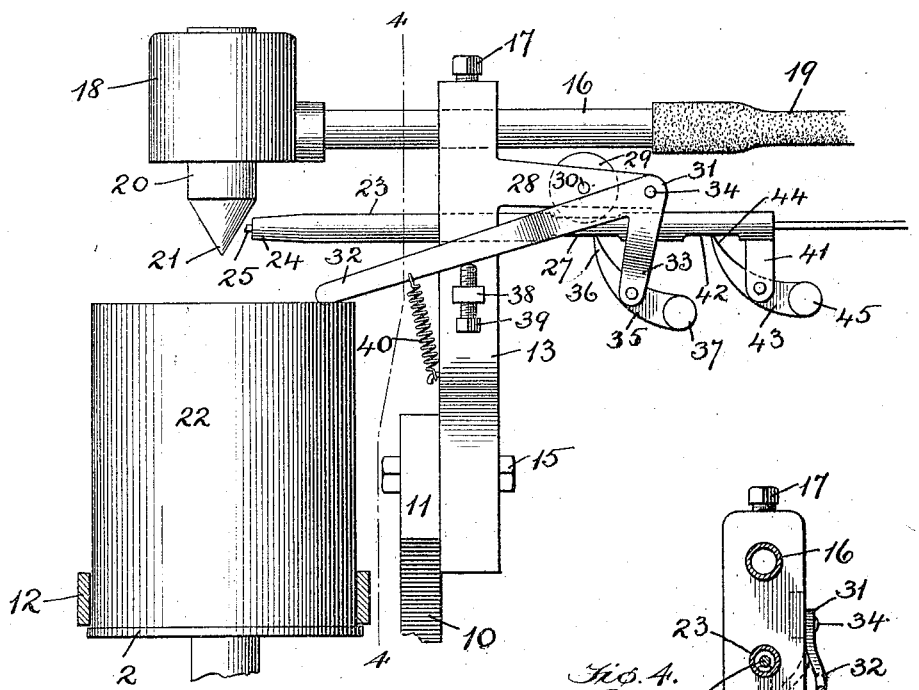
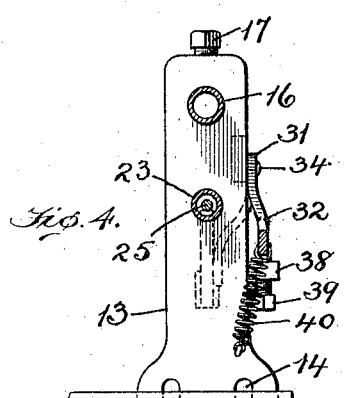
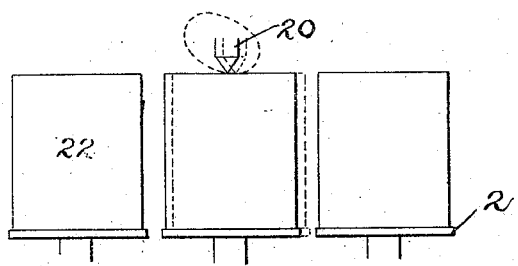
Witnesses
Edwin L Bradford
G. Ferd. Vogt.
Inventor
Charles H. Ayars
By
Mann & Co,
Attorneys,

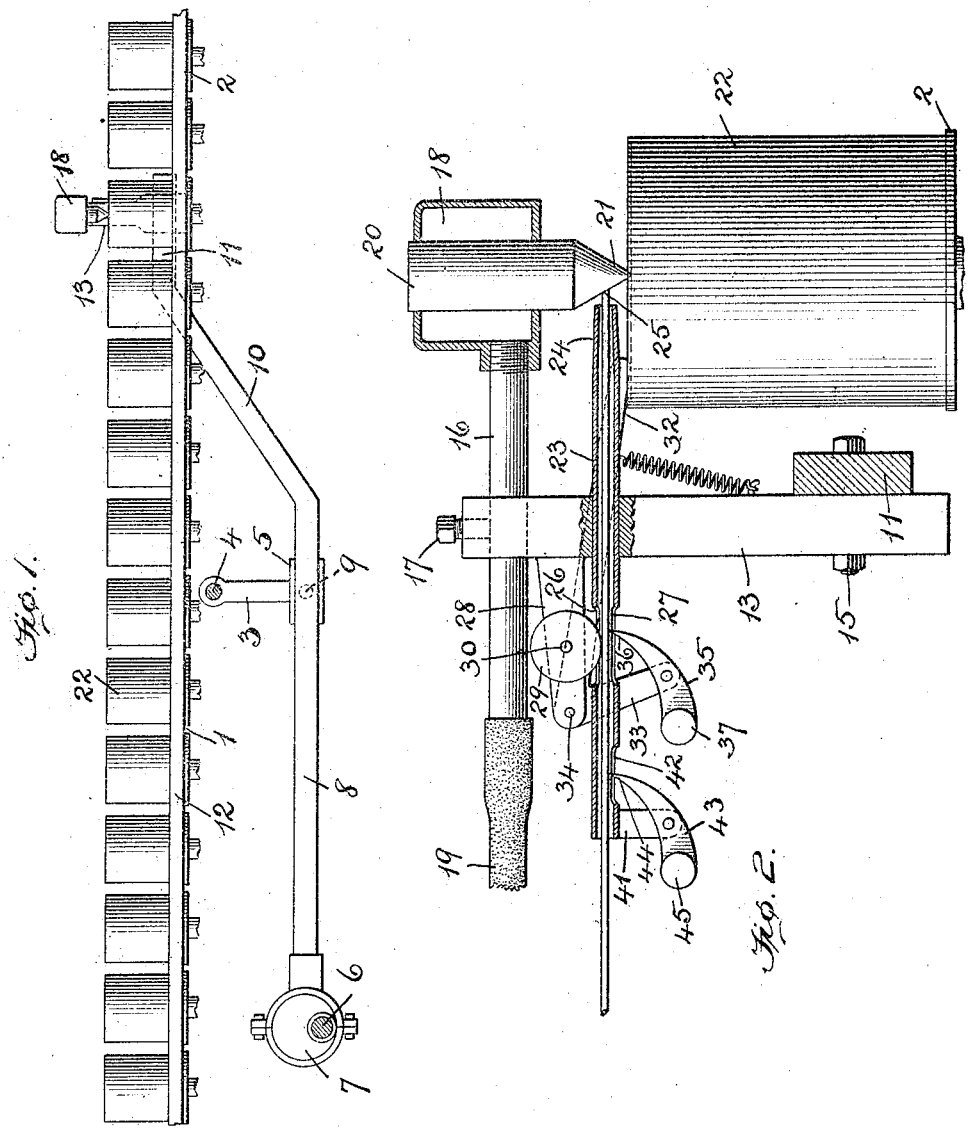

UNITED STATES PATENT OFFICE.

CHARLES H. AYARS, OF SALEM, NEW JERSEY, ASSIGNOR TO AYARS MACHINE COMPANY, OF SALEM, NEW JERSEY, A CORPORATION OF NEW JERSEY.

MACHINE FOR SOLDERING THE CAP ENDS OF CANS.

961,743.  Specification of Letters Patent.  Patented June 14, 1910.

Application filed October 27, 1909. Serial No. 524,781.

*To all whom it may concern:*

Be it known that I, CHARLES H. AYARS, a citizen of the United States, residing at Salem, in the county of Salem and State of New Jersey, have invented certain new and useful Improvements in Machines for Soldering the Cap Ends of Cans, of which the following is a specification.

This invention relates to a machine for soldering can caps and has particular reference to an improved mechanism for soldering and closing the vent-holes in such caps.

One object of the present invention is to provide an improved means for supporting and moving the soldering or tipping iron so that the latter may have a movement that will cause it to meet and travel with the can and to then reverse its movement and return to meet other cans,—the latter being conveyed during the soldering operation.

Another object is to provide an improved construction and arrangement of solder feed mechanism whereby the amount of solder to be fed may be regulated to a nicety and further that solder may be fed only when a can is in position to be operated upon.

A further object is to provide a construction wherein the solder feed and the iron will together move back and forth over the traveling cans and by thus maintaining them in a given relation materially increase their efficiency and enable the iron to be operated at a lower temperature and the life of the latter prolonged.

With these and other objects in view the accompanying drawings illustrate the invention wherein,—

Figure 1, is a side elevation of a can conveying mechanism and the improved means for operating the iron. Fig. 2, an enlarged cross-sectional elevation of the same and also of the solder feed mechanism from one side of the latter. Fig. 3, a similar view as seen from the opposite side. Fig. 4, is a vertical sectional view on the line 4—4 of Fig. 3, and shows the adjustable bracket or support that carries the iron and solder feed, and Fig. 5, is a diagrammatic view of the can conveyer seats with cans thereon and illustrates the direction of movement of the iron with respect to the cans.

The present invention is designed to be operated in connection with other machinery employed in the packing art such for example as a capping machine which receives the caps over the filling opening of the cans and which caps contain the vent holes to be soldered or tipped, and it is desirable that the cans be conveyed from the capper to the tipper without manual handling. With this understanding the numeral, 1, in the drawings designates a conveyer of any suitable construction, but which in the present instance consists of a plurality of circular disks or can seats, 2, which travel in a horizontal plane while sustaining the cans with their cap-ends uppermost. This conveyer is of such construction that the cans are moved forward continuously and are spaced apart at uniform intervals. In the present instance I provide a swinging bracket, 3, adjacent the conveyer which is pivotally mounted on a suitable support or rod, 4, from which it hangs pendently, and the lower end of this bracket has a block or head, 5, rigidly connected therewith for a purpose presently to be described.

A driving shaft, 6, supported and driven in any suitable manner, extends horizontally at one side of the swinging bracket support, 3, and an eccentric, 7, is provided on said shaft by means of which motion is to be imparted to the iron. The driving shaft, 6, may obviously be carried by and driven from the capper machine proper, or if desired, may be independently driven.

A bar, 8, is connected at one end to the eccentric, 7, and extends therefrom and past the swinging bracket support, 3, and said bar is pivotally connected to the block or head, 5, of said bracket support by means of a pivot pin, 9, so that it may have a rocking movement with respect to the support as it is reciprocated by the eccentric. Beyond the support, the bar inclines upwardly as at 10, so as to extend from the lower to the upper side of the conveyer and has a horizontally-extending end, 11, located in the present instance at one side of the conveyer and row of cans. Suitable side rails or guides, 12, are provided at opposite sides of the cans to prevent lateral displacement of the same from the conveyer as they advance.

It will be understood that as the eccentric turns with the shaft, 6, the bar, 8, will be reciprocated longitudinally, and by means of the pivoted connection with the swinging bracket support, 3, the end, 11, of the bar will have both a reciprocating and a rocking motion,—that is, it will be raised and lowered as it reciprocates. This motion is especially adapted for the purpose of raising the soldering iron from the can; then returning it, while raised, to meet another can, and finally to lower the iron onto the can thus met.

By reference to Figs. 2, 3 and 4 it will be noted that the free end of the bar, 8, sustains a vertical bracket, 13, the lower end of which is adjustably connected to the said bar by means of slots, 14, and set bolts, 15, for a purpose presently to be explained. This bracket serves to sustain the soldering iron and also the solder supporting mechanism so that they may be maintained in a definite relation with respect to each other during their movements back and forth over the cans.

In the present instance, a tube, 16, extends through a suitable perforation at the upper end of the bracket, 13, and is adjustable longitudinally therein by means of a set screw, 17, and one end of said tube carries a chambered head, 18, while the opposite end thereof is connected to a flexible tube, 19, through which a heating agent, such as gas, is supplied to the chambered head, 18, where it is ignited to heat the iron, 20, which depends therefrom so that its lower soldering end, 21, may be maintained in a centered position over the cap-ends of the cans, 22. Obviously the tube, 16, may be moved longitudinally with respect to the bracket, 13, to accurately center the iron over the cans whenever a change from one size can to another is made. A solder-guide tube, 23, is also sustained by the vertical bracket, 13, and has one end, 24, terminating adjacent, and preferably in close proximity to the soldering end, 21, of the iron, so that the end of wire solder, 25, which passes through the tube may be directed against the iron near the working end thereof. The solder-guide tube, 23, is provided with longitudinal slots, 26 and 27, at diametrically opposite sides so that suitable solder-feed devices may operate on the strand of solder and feed it forward through the tube to the iron. While this feed mechanism may vary in the details of construction I have found the form shown to be practical and by reference to Figs. 2 and 3 of the drawing will describe the same.

An arm, 28, extends laterally from the vertical bracket, 13, and in the present instance carries a revoluble member such as a roller or disk, 29, which turns on a pivot, 30, in a vertical plane and the lower circumferential edge of which projects into the slots 26, of the solder tube and against the upper surface of the wire solder strand. A lever, 31, has a long inclined arm, 32, and a shorter depending arm, 33, which extend at an angle with respect to each other and said lever is pivotally attached at 34 to the arm, 28. The long arm, 32, projects over the tops of the cans so that it may seat on top thereof and be supported by the can as the bracket, 13, and iron, 20, lower to bring the iron into operative position on the can top. The shorter depending arm, 33, projects below the solder-feed tube and a pawl, 35, is pivotally sustained therefrom at a point between its two ends, 36 and 37, respectively. The end, 36, of this pawl projects upwardly and enters the slot, 27, in the solder tube and impinges against the lower surface of the wire solder strand, while the end, 37, is weighted so as to keep the point end in engagement with the solder.

It is to be understood that as the lever, 31, is carried indirectly by the vertical bracket, 13, and the iron and solder tube are also carried by the same bracket, all of said devices will be reciprocated together with respect to the conveyer, but as the lever, 31, is pivoted with respect to the said bracket, the latter may descend after the end, 32, of said lever seats on a can and by this further movement of the bracket, the arm, 33, will swing toward the said bracket and thus move the pawl, more or less, lengthwise of the slot, 27, and thus push the solder forward through the tube toward the iron. It will thus be seen that the feeding of solder to the iron is accomplished as the latter is centering over the can end and just at the time the solder is needed.

The stroke or movement of the lever, 31, and feed pawl, 35, may be varied to regulate the quantity of solder to be fed for each can cap as can be readily seen in Figs. 3 and 4 wherein the bracket, 13, is shown as having a side lug, 38, which projects laterally from the bracket beneath the inclined arm, 32. A set-screw, 39, passes through said lug and forms a stop on which the arm rests and by this means the downward movement of the arm, 32, and the rearward movement of the arm, 33, and pawl end, 36, may be varied. A spring, 40, draws down continuously on the arm, 32, but will yield when the vertical bracket, 13, descends while the arm, 32, is resting upon a can end.

The rear end of the solder-feed tube is provided with a depending arm or lug, 41, while in front of said lug the tube is provided with a longitudinal slot, 42, along its under side. A pawl, 43, is pivotally mounted on the lug and has a point-end, 44, that enters the slot and engages the strand of solder. A weight, 45, is provided at the other end of the pawl to keep the point-end against the solder. The purpose of this pawl, 43, is to hold the solder strand while the feed pawl, 35, is making its return movement to take a fresh bite on the solder.

It is to be understood that the bar, 8, may carry a plurality of brackets, 13, at its end, 11, or one bracket may carry a plurality of irons so that instead of operating on one can at a time a plurality of cans may be soldered at one time.

By means of the present invention the feed of solder may be adjusted or regulated to a nicety and by a simple turn of the screw, 39; the solder and tube both traveling with the iron while maintained in the same relation prevents the splashing of solder as occurs where the iron and tube have movement with respect to each other, and also enables the solder to be melted by the iron during the return operation. This fixed relation of iron and solder also effects a saving in the fuel because the temperature of the iron need not be so great as ample time is given on the return movement for the iron at a lower temperature to melt the solder. A further practical advantage is that of speed which has been increased fifty per cent. by maintaining the iron and solder in fixed relation.

Having thus described my invention what I claim and desire to secure by Letters Patent is,—

1. The combination with means to move the cans, of a soldering iron; a solder support and means for moving the iron and solder support in one direction with the cans and then reverse the movement of both iron and solder support to meet other cans.

2. The combination with means to move the cans forward, of a soldering iron; a solder guide having a fixed relation to the iron and means for moving both iron and guide forward with the cans during the soldering operation and then moving both the iron and guide backward to meet other cans.

3. The combination with means to move the cans, of a soldering iron; a solder guide adjacent the iron; means for feeding solder to the guide; means for moving the iron and solder guide in one direction with the cans and means for raising the iron and solder guide from the cans and returning them to meet other cans.

4. The combination with means to move cans, of a soldering iron maintained in a pendent position above the can-moving means; a solder guide adjacent the iron and means for moving the pendent iron and solder guide in a straight line with the cans and return them to meet other cans.

5. The combination with means to move the cans in a row, of a soldering iron sustained in a pendent position above the can-moving means; a solder guide tube extending toward the iron; means for feeding the solder through said tube, and means for reciprocating the tube and iron back and forth above the can-moving means.

6. The combination with means to move the cans, of a support at one side of the can-moving means; a soldering iron sustained from said support and having a pendent position over the said moving means; a solder-feed tube also sustained from said support and projecting toward the iron, and means for reciprocating the support, iron and tube with respect to the moving means.

7. The combination with means to move the cans, of a support; a soldering iron sustained by the support; a solder-feed tube also sustained by the support; a bar extending parallel with the can-moving means, and means for reciprocating the bar, support, iron and tube with respect to the can-moving means.

8. The combination with means to move the cans, of a soldering iron; a solder-feed tube having a fixed relation with respect to the iron; a solder-feed mechanism, and means for first moving the iron and tube with the can moving means and then reversing the movement of the said iron and tube with respect to the moving means.

9. The combination with means to move the cans, of a support; a soldering iron carried by the support; a solder-feed tube also carried by the support; a solder-feed mechanism carried by the support, and means for reciprocating the support back and forth with respect to the moving means.

10. The combination with means to move the cans, of a support at one side thereof; a soldering iron carried by the support; a bar connected with the support, and means for reciprocating the bar longitudinally and moving the support and iron back and forth.

11. The combination with means to move the cans, of a support at one side thereof; a soldering iron carried by the support; a bar connected with the support; means adjacent one end of the bar for reciprocating the same and means for rocking the support and iron while they are reciprocated by the bar.

12. The combination with means to move the cans, of a support at one side thereof; a soldering iron carried by the support; a bar sustained between its ends so as to swing longitudinally and connected with the support and means for swinging the bar.

13. The combination with means to move the cans, of a support at one side thereof; a soldering iron carried by the support; a bar sustained between its ends so as to swing longitudinally and having its forward end connected with the support and a revoluble member at the other end of the bar to reciprocate the latter longitudinally.

14. The combination with means to move the cans, of a support at one side thereof; a soldering iron carried by the support; a bar having its forward end connected with the support; a swinging bracket for pivotally sustaining the bar between its ends and an eccentric at the other end of the bar for moving the same longitudinally.

15. The combination with means to move the cans, of a soldering iron; a solder-feed tube having a slot; feed mechanism operating through the slot to feed the solder and means for moving the iron, tube and feed mechanism together back and forth over the cans.

16. The combination with means to move the cans, of a soldering iron; a solder-feed tube having a slot; a movable device projecting into said tube slot to engage the solder; means operated by a can to actuate the movable device and means for moving the iron and tube back and forth so as to travel with a can and return to meet other cans.

17. The combination with means to move the cans, of a soldering iron; a solder-feed tube having slots at opposite sides; a pawl projecting through one of said slots; a rotary member projecting through the other slot; lever mechanism operated by the cans for actuating the said pawl and means for moving the iron, tube, rotary member and lever mechanism back and forth over the can-moving means.

18. The combination with means to move the cans, of a support; a soldering iron carried by the support; a solder-feed tube also carried by the support and having a plurality of slots; a lever carried by the support and projecting into the path of the cans; a pawl carried by said lever and entering one of said slots; means operating through the other slot of the tube to prevent the backward movement of the solder and means for moving the iron, tube, lever and pawl back and forth over the can moving means.

In testimony whereof I affix my signature in presence of two witnesses.

CHARLES H. AYARS.

Witnesses:
  I. OAKFORD ACTON,
  MARY D. BANKS.